United States Patent
Heckmann et al.

(10) Patent No.: US 6,525,432 B2
(45) Date of Patent: *Feb. 25, 2003

(54) METHOD AND DEVICE FOR OPERATING A DISPERSED CONTROL SYSTEM IN A MOTOR VEHICLE

(75) Inventors: Hans Heckmann, Karlsruhe (DE); Reinhard Weiberle, Vaihingen/enz (DE); Bernd Kesch, Hemmingen (DE); Peter Blessing, Heilbronn (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/542,491

(22) Filed: Apr. 3, 2000

(65) Prior Publication Data

US 2002/0180270 A1 Dec. 5, 2002

(30) Foreign Application Priority Data

Apr. 3, 1999 (DE) .......................................... 199 15 253

(51) Int. Cl.$^7$ ................................................ B60R 16/02
(52) U.S. Cl. ........................................ 307/10.1; 303/20
(58) Field of Search ................................ 307/9.1, 10.1; 303/199, 20

(56) References Cited

U.S. PATENT DOCUMENTS

| | | | | |
|---|---|---|---|---|
| 4,412,281 A | * | 10/1983 | Works ........................ 364/200 |
| 4,516,063 A | * | 5/1985 | Kaye et al. .................. 318/685 |
| 4,594,571 A | * | 6/1986 | Neuhaus et al. ............. 307/10.1 |
| 4,942,571 A | * | 7/1990 | Moller et al. ............... 307/10.1 |
| 5,002,343 A | * | 3/1991 | Brearley et al. ........ 188/112 R |
| 5,027,002 A | * | 6/1991 | Thornton ..................... 307/35 |
| 5,547,208 A | * | 8/1996 | Chappell et al. ........... 307/10.1 |
| 5,654,859 A | * | 8/1997 | Shi ............................. 361/66 |
| 5,675,189 A | * | 10/1997 | Anma et al. ............... 307/10.1 |
| 5,952,799 A | * | 9/1999 | Maisch et al. .............. 318/362 |
| 6,029,108 A | * | 2/2000 | Belschner ................... 307/9.1 |
| 6,189,981 B1 | * | 2/2001 | Niedermeier ................ 303/20 |
| 6,199,670 B1 | * | 3/2001 | Shirai et al. ................ 303/20 |
| 6,299,261 B1 | * | 10/2001 | Weiberle et al. ............. 303/20 |
| 6,345,225 B1 | * | 2/2002 | Bohm et al. ................ 180/197 |
| 6,424,900 B2 | * | 7/2002 | Murray et al. ................. 701/1 |

FOREIGN PATENT DOCUMENTS

| | | | |
|---|---|---|---|
| DE | 196 34 567 | | 3/1998 |
| DE | 199 15 253 | * | 10/2000 ........... B60R/16/02 |

* cited by examiner

Primary Examiner—Fritz Fleming
(74) Attorney, Agent, or Firm—Kenyon & Kenyon

(57) ABSTRACT

A dispersed control system for use in a vehicle. The dispersed control system includes a plurality of electrical control units that exchange data via a communication system. The system includes at least two power sources that are independent of each other and that supply each of the plurality of electrical control units with a voltage. The communication system includes at least two channels, and bus drivers are provided in each electrical control unit so that each channel is supplied with a voltage from a different one of the at least two power sources.

9 Claims, 2 Drawing Sheets

METHOD AND DEVICE FOR OPERATING A DISPERSED CONTROL SYSTEM IN A MOTOR VEHICLE

FIELD OF THE INVENTION

The present invention relates to a method and device for operating a dispersed (distributed) control system in a vehicle.

BACKGROUND INFORMATION

In motor vehicles, dispersed control systems are used currently, or will be in the future, in many application cases, provision being made in control systems of this type for decentralized electronics, which drive control elements "on-site," optionally in cooperation with central control electronics. Systems of this type are provided above all for controlling braking systems, whether in the case of electro-pneumatic, electro-hydraulic braking systems or braking systems having an electromotive clamping of the wheel brakes. In addition, dispersed systems of this type can also be employed in internal combustion engine control, for example for controlling a throttle valve, or for steering controls.

German Patent No. 196 34 567 concerns a dispersed control system of this type. As discussed, a braking system is shown that has wheel brakes having electromotive clamping. For making available the desired quantities for the individual wheel brakes, at least one central electronics is provided that, via at least one communications system, provides the quantities or values, which may be necessary for controlling the wheel brakes, to control units that are arranged "on-site" with respect to the wheel brakes. Via the communications system, the central unit receives the operating quantities necessary for controlling the wheel brakes, the operating quantities being determined onsite by the individual wheel control units. For assuring operating safety, provision is made for two power sources (batteries, vehicle electrical systems), that are independent of each other, for supplying the individual electrical elements. Accordingly, the individual electrical elements are supplied either by the two sources or by one of the sources, so that if one of the sources fails, at least partial operation of the braking system can be maintained. For communicating between the central control units and the control units disposed "on-site" for controlling the wheel brakes, provision is made for two communications systems (bus systems), that are physically and/or electrically separated from each other. Since these bus systems are also supplied by different power sources, even in the event of the failure of one power source or of one communications system, at least partial operation of the braking system continues to be possible.

For example, the publication "VDI Reports No. 1415, 1998, pp. 325 through 344" concerns an electrical braking system that uses an error-tolerant, timed communications system (which may be referred to as a TTP/C communications system). In this dispersed braking system, the individual electronic units are connected to each other by a bus system, the communication being carried out in accordance with a timed protocol, such as the TTP/C protocol. In this context, as concerns hardware, the bus system is composed of two bus systems that are redundant with respect to each other, resulting in two communications channels, to which all electronic systems of the distributed or dispersed control system have access. It is precisely in the case of applications that are critical to safety, in particular in the operation of a braking system, that at least partial functionality of the braking system control is necessary even in the event of the failure of a power source. This also applies when a redundant communications system of this type having a timed protocol is used.

SUMMARY OF THE INVENTION

It is an object of an exemplary embodiment of the present invention, specifically in connection with a safety-critical, dispersed vehicle control system, to fulfill the requirements having to do with power supply, even when a timed-redundant bus system is used.

The requirements with respect to the power supply of a communications system used in safety relevant, dispersed control systems in vehicles, in particular in braking systems, are met even when, as a communications system, an error-tolerant bus system having at least two independent communications channels (e.g., having a TTP/C protocol) is used. In a particularly advantageous manner, in the event of the failure of a power source, the normal operation of at least one part of the communications system and therefore also of the control system is assured.

In an exemplary embodiment of the present invention, the communications channels of the bus, whose hardware is configured so as to be redundant, are each supplied by completely independent (i.e., physically separated power sources) and are themselves not electrically coupled. Thus the effects of a fault, such as a short-circuit in an energy storage mechanism or an earth short-circuit of the bus channel, on the respective power circuit remain limited and the overall system remains partially functional.

It is believed that the corresponding advantages are achieved not only in connection with the use of a TTP/C bus, but also with the use of any suitably appropriate bus system having redundant communications channels, especially having a timed protocol.

In an exemplary embodiment of the present invention, redundancy is assured both with respect to the physical transmission as well as with respect to the voltage supply of the bus. This improves the availability and the operational safety of the control system significantly.

In an exemplary embodiment of the present invention, the electrical separation is achieved using optical elements.

In an exemplary embodiment of the present invention, redundancy with respect to the power supply of the bus is realized through the fact that the bus driver microchips of an electronic system connected to the bus are supplied by different power sources for each channel, whereas the actual controller microchip, which is present for each system only singly for both channels, is connected for bus access to only one power source. In this manner, in the event of the failure of one power source, it remains possible for at least parts of the dispersed system to communicate via the still functional channel.

DETAILED DESCRIPTION

Figure 2:
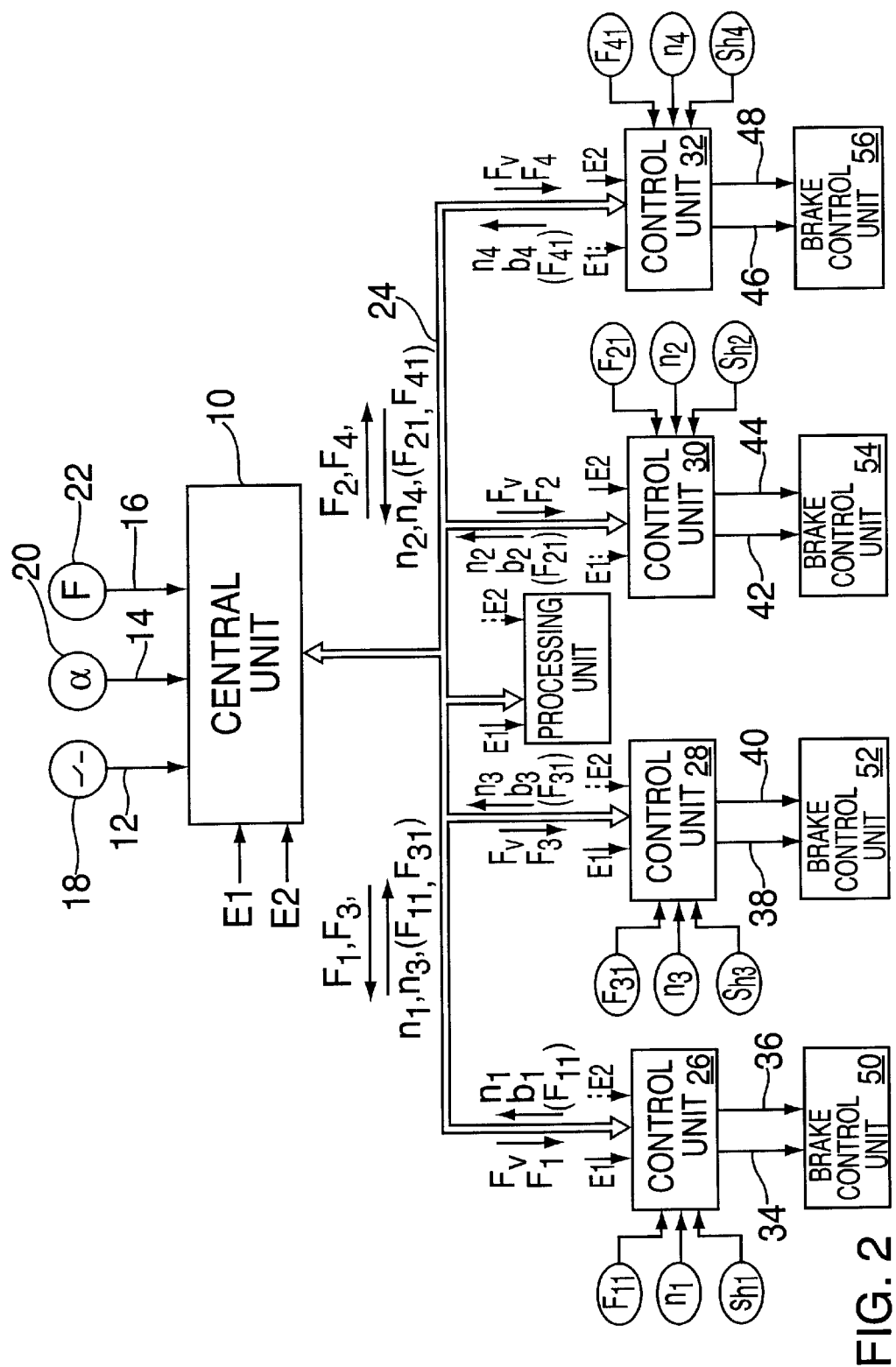
FIG. 2 shows an exemplary application of the solution of FIG. 1, in which the exemplary embodiment of FIG. 2 uses a braking system having dispersed electronics.

FIG. 2 shows an exemplary embodiment of the present invention, which has a control system having dispersed electronics in a vehicle, using the example of the braking system. A central unit 10, receives, via corresponding input lines 12, 14, and 16, inputs from corresponding measuring devices 18, 20, 22. The inputs represent various quantities representing the actuation of the brake pedal by the driver. The central unit 10 contains at least two microcomputers, each of which is supplied with power by one of two power sources E1 and E2. In each case, independently of the input actuation quantities, the two microcomputers form the wheel brakes' set-point quantities (FV) that they provide via communications system 24 to control units 26, 28, 30, and 32, which are disposed in the area of the wheel brakes. The control units, via drive or selection lines 34 and 36, 38 and 40, 42 and 44, 46 and 48, drive electromotively operated brake control units 50, 52, 54, and 56, along the lines of set-point values. In addition, a processing unit 58 is provided, which, taking into account the wheel-specific functions, determines wheel-specific braking set-point values F1 through F4 and transmits them to corresponding control units 26 through 32 via communications system 24. For purposes of driving braking control units or of calculating the wheel-specific functions in processing unit 58, wheel-specific quantities are used, e.g., braking forces exerted F1i through F4i, corresponding wheel speeds n1 through n4, as well as actuating distances sh1 through sh4 of the corresponding wheel brakes, which, to the extent that they are necessary for carrying out the functions or operations in other units, are transmitted via communications system 24 to other units. In this context, derived operating quantities can also be transmitted, such as wheel accelerations b1 through b4, which are derived from the wheel speed in the wheel units. Control units 26 through 32 and processing unit 58 include in each case at least one microcomputer, which carries out the functions or operations assigned to it. All the cited control units are connected to communications system 24 via an interface microchip (controller and driver). Communications system 24 is a communications system that is redundant with respect to its hardware, and that offers two transmission channels that are independent of each other. In an exemplary embodiment, the communications system is operated using a timed protocol, such as, for example, a protocol according to the specification of TTP/C. For assuring the operating safety of the control system even in the event of the failure of one of the power sources, at least the interface microchips ensuring the communication of the individual units via communications system 24 are supplied by both power sources E1 and E2. In FIG. 2, this is shown in the leads of both power sources to the individual control units.

Communication system 24 includes two redundant bus systems, such as, for example, two CAN (controller area network) buses. An interface microchip controls the transmitting and receiving process via the communications system for both channels, for each unit connected to the communications system. The interface microchip includes at least one controller common to both channels and a separate bus driver for each channel. According to an exemplary embodiment of the present invention, redundancy is provided with respect to the power supply, with all of the bus drivers of a first channel having a supply voltage VCC1 being supplied from the first power source E1 and all bus drivers of the second channel having supply voltage VCC2 being supplied from the power source E2. The result of this is that the bus drivers of one interface to the communications system are supplied from two different power sources. Each microcomputer of the unit connected to the communications system and the bus controller itself are supplied from only one of the power sources. For example, this is indicated in an exemplary braking system forming two braking circuits. In accordance with the braking system, for example, the microcomputer and the bus controller of the control units that control the front wheel brakes being connected to the first power source E1, and the elements that control the rear axle brakes being connected to the second power source E2. A diagonal subdivision, for example, may also be useful.

To avoid an electrical coupling of the two power sources via signal and connecting lines between the bus drivers and the bus controllers, an electrical separating element is provided in these lines.

This separating element may be an optical coupler. In each connecting line between the controller and the bus driver supplied by a different power source, a separating element must be present.

Figure 1:
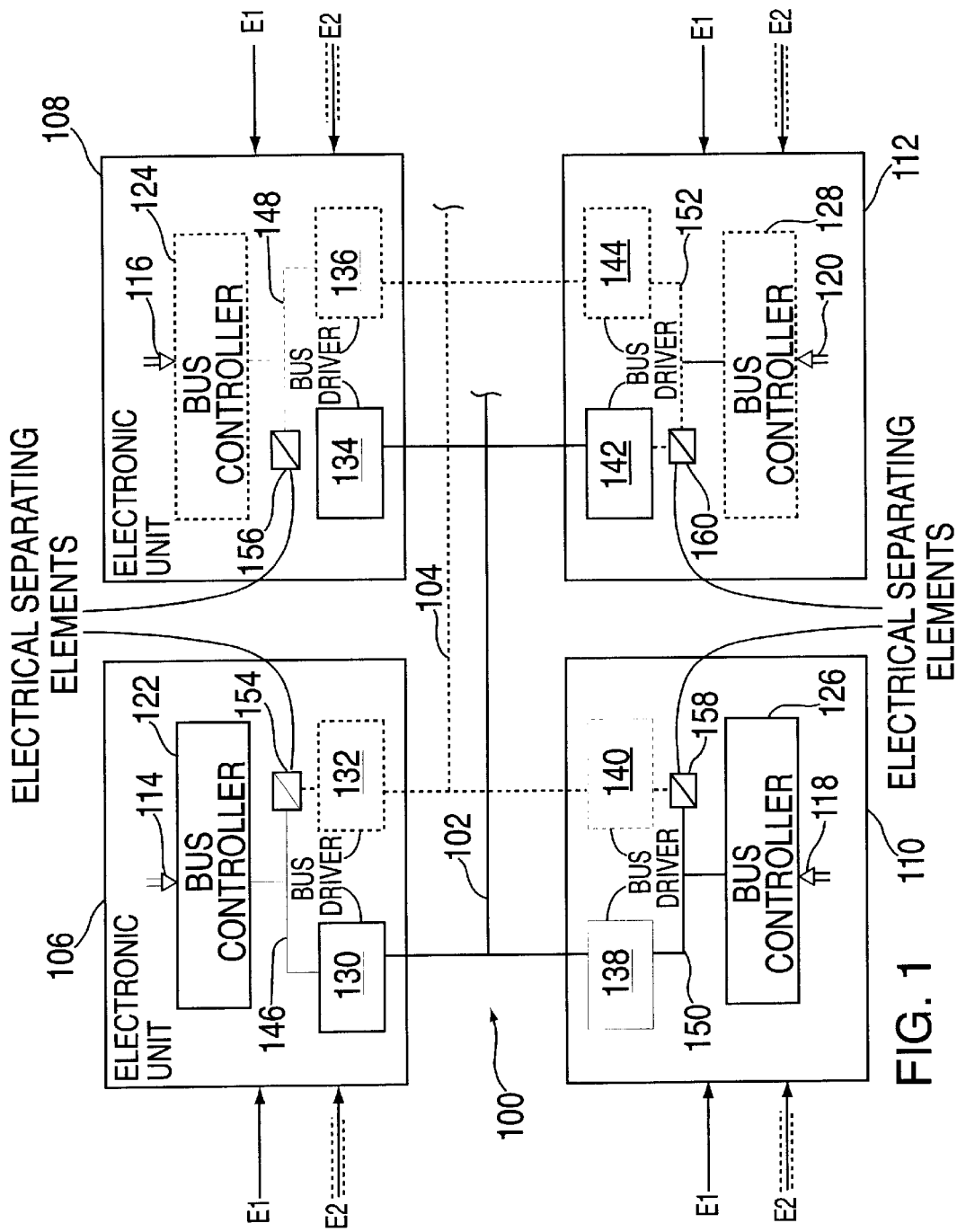
FIG. 1 shows a dispersed control system, in which a communication system having at least two redundant communications channels is used and which is supplied by different power sources.

An exemplary embodiment of the bus interface is shown in FIG. 1, which shows an exemplary embodiment that is applicable for all suitably appropriate applications having distributed or dispersed electronics systems that are connected to a communications system having two independent transmission channels. FIG. 1 shows a communications system 100, which includes at least two redundant buses 102 and 104. Connected to this communication system are units 106, 108, 110, 112 shown in FIG. 1, as well as further units if appropriate, which are all provided with at least one microcomputer. The latter is not shown in FIG. 1 for reasons of clarity, but is indicated (see 114, 116, 118, 120) by corresponding connecting lines to the elements shown in FIG. 1. In what follows, units 106 through 112 are designated as the host computer. The interface to the communications system in each unit is formed, in each case, by one interface microchip, which has at least one bus controller (122, 124, 126, 120) and two bus drivers (130, 132; 134, 136; 138, 140; 142, 144). Each of these bus drivers is connected to a bus line. Thus, for example, a bus driver 130 is connected to a bus line 102 and a driver 132 is connected to a bus line 104. Via internal signal lines 146, 148, 150, 152, bus drivers are connected to the bus controller of the respective unit. In the exemplary embodiment of a TTP/C communications system, the bus controllers and the bus drivers are integrated in one microchip. In this context and in the exemplary embodiment, in which both bus lines 102 and 104 represent CAN buses, CAN bus drivers are used as bus drivers. As indicated above, the elements shown in FIG. 1 are supplied with power from different power sources. In this context, the power supply for the respective bus drivers is designed such that the at least two bus drivers of one unit are supplied from two different power sources (sources E1, E2 having voltages VCC1, VCC2). Accordingly, the elements in FIG. 1 that are supplied from power source E2 are indicated with dotted lines, and the elements supplied by power source E1 are indicated by solid lines. The result is that the driver microchip of one of the two buses (and therefore the corresponding transmission channel) is supplied with voltage by the first power source E1, and the driver microchip of the other one is supplied with voltage by the other power source E2.

The bus controller itself is supplied with voltage by only one power source. In this context, the bus controllers are assigned to the individual power sources in view of the functioning of the control system. In braking systems, such as those mentioned above, the distribution or dispersion is such that even if one power source fails, a relevant braking effect is carried out solely based on the partial system that is still functional, with the assistance of the other power source. Accordingly, in FIG. 1, controllers 122 and 126 are assigned to power source E1, and controllers 124 and 128 are assigned to power source E2. The same also applies to the microcomputers of the individual units not shown in FIG. 1.

In the operation of the control system according to FIG. 1, the data to be transmitted from each unit are always transmitted on both channels, so that in the event of the failure of one power source, the information exchange can at least partially be maintained.

To avoid electrical couplings between the individual power circuits, in particular over the signal lines between the bus driver and the controller, provision is made in all of the signal lines that are located between the bus driver and a controller having different power sources for electrical separating elements 154, 156, 158, 160, which in the exemplary embodiments are configured as optical couplers. Optionally, the signal lines, in which an electrical separating element is provided, can also be replaced by optical transmission media (optical fibers).

The shown embodiments in connection with any suitably appropriate bus system having at least two channels are applicable using separated bus drivers for each channel, even apart from the braking system control, in the case of all suitably appropriate safety-relevant control systems in vehicles that operate using dispersed electronics.

If more than two channels are provided, at least two of the bus drivers are supplied by one other power source in each case.

What is claimed is:

1. A dispersed control system associated with a vehicle, comprising:
    a control system having a plurality of electronic units for exchanging data via a communication system having at least two channels; and
    at least two power sources, each of which being independent of one another and each of which supplying the plurality of electronic units with a voltage;
    wherein:
        at least one of the electronic units includes at least two bus drivers, each of the at least two bus drivers being supplied a voltage from a different one of the at least two power sources; and
        at least one of the at least two bus drivers is provided for each channel of the at least two channels.

2. The dispersed control system of claim 1, wherein:
    the dispersed control system is a braking system having a plurality of wheel brakes and a plurality of brake systems; and
    each wheel brake and each wheel brake system is associated with a corresponding electronic unit of the plurality of electronic units communicating with another electronic unit of the plurality of electronic units via the communication system.

3. The dispersed control system of claim 1, wherein the communication system includes a TTP/C bus.

4. A device for use in a dispersed control system associated with a vehicle having a plurality of wheel brakes or wheel brake systems, the device comprising:
    an interface for use in an electronic unit for a wheel brake or wheel brake system of the dispersed control system and to which a communication system of the dispersed control system can be connected, wherein the communication system has at least two channels, and wherein the interface includes at least two bus drivers, each being supplied a voltage from a different one of at least two power sources associated with the dispersed control system.

5. The device of claim 4, wherein:
    the interface includes a bus controller; and
    at least one of the at least two bus drivers is supplied a voltage from a different one of the at least two power sources than is the bus controller and another of the at least two bus drivers.

6. The device of claim 5, further comprising a line situated between the bus controller and the at least one of the at least two bus drivers being supplied from the different one of the at least two power sources than is the bus controller, wherein an electrical separating element is coupled in the line.

7. The device of claim 6, wherein the electrical separating element includes an optical coupler.

8. The device of claim 5, wherein at least one of a data transmission and an optical transmission is provided between the bus controller and the at least one of the at least two bus drivers being supplied from the different one of the at least two power sources than is the bus controller so that there is substantially no electrical coupling between them.

9. The device of claim 4, wherein:
    the dispersed control system includes a plurality of electronic units, each of the electronic units having an interface microchip having a bus controller and at least two bus drivers; and
    the bus controller and one of the least two bus drivers is supplied with current from one of the at least two power sources and the other bus driver is supplied with current from the different one of the at least two power sources.

* * * * *